United States Patent [19]
Schlom et al.

[11] Patent Number: 5,833,755
[45] Date of Patent: Nov. 10, 1998

[54] STARCH DEGRADATION USING METAL-BASED COORDINATION COMPLEXES

[75] Inventors: Peter J. Schlom, Somerville; Rose Ann Schultz, Princeton, both of N.J.

[73] Assignee: National Starch and Chemical Investment Holding Corporation, Wilmington, Del.

[21] Appl. No.: 824,058

[22] Filed: Mar. 24, 1997

Related U.S. Application Data

[63] Continuation-in-part of Ser. No. 621,560, Mar. 25, 1996, abandoned.

[51] Int. Cl.⁶ .......................... C08B 30/12; C08B 30/00; C08B 33/04
[52] U.S. Cl. .................. 127/32; 127/33; 127/65; 127/70; 127/71; 536/50; 536/102; 536/106; 536/107; 536/111
[58] Field of Search ................... 127/32, 33, 65, 127/70, 71; 536/102, 106, 107, 111, 50

[56] References Cited

U.S. PATENT DOCUMENTS

| | | | |
|---|---|---|---|
| 3,655,644 | 4/1972 | Durand | 260/233.3 R |
| 3,975,206 | 8/1976 | Lotzgesell et al. | 127/71 |
| 4,314,854 | 2/1982 | Takagi | 127/37 |
| 4,649,113 | 3/1987 | Gould | 127/37 |
| 4,838,944 | 6/1989 | Kruger | 127/71 |
| 5,153,161 | 10/1992 | Kerschner et al. | 502/167 |
| 5,246,612 | 9/1993 | Van Djik et al. | 252/102 |
| 5,284,944 | 2/1994 | Madison et al. | 540/474 |

*Primary Examiner*—Mark L. Bell
*Assistant Examiner*—Patricia L. Hailey
*Attorney, Agent, or Firm*—Eugene Zagarella, Jr.

[57] ABSTRACT

A process for the degradation of starch, particularly granular starch, using hydrogen peroxide and a catalytic amount of a metal-based coordination complex in an alkaline slurry reaction.

28 Claims, No Drawings

STARCH DEGRADATION USING METAL-BASED COORDINATION COMPLEXES

This application is a continuation-in-part of application Ser. No. 08/621,560 filed Mar. 25, 1996 now abandoned.

BACKGROUND OF THE INVENTION

This invention relates to a process for the degradation of starch using hydrogen peroxide and a selected metal-based coordination complex catalyst, particularly a manganese complex.

Degraded or converted starches are used in many applications where low-viscosity starches are needed to provide a high-solids starch dispersion with a pumpable and workable viscosity. The degradation of starches by conversion involves mainly a scission of the starch molecules to lower molecular weight fragments. When this is carried out on a granular starch, the granular structure is weakened and the granules tend to disintegrate more readily and more rapidly during the gelatinization process, leading to a lower hot paste viscosity.

Industrial applications in which degraded or converted starches are desirably used or required include paper and paper board manufacture, the manufacture of gypsum board for dry wall construction, textile warp sizing applications and the production of starch gum candy.

In commercial practice, starch is ordinarily converted by acid or enzyme conversion techniques. Acid conversion is preferred due to the ease in handling and recovery afforded by a granular starch as opposed to starch in dispersed form as necessitated by enzyme conversion. A recently developed process for degradation of granular starch involves a process employing hydrogen peroxide and a manganese salt catalyst such as potassium permanganate in alkaline slurry.

In preparation of converted starches by acid treatment, the granular starch base is hydrolyzed to the required viscosity in the presence of an acid, such as sulfuric or hydrochloric acid, at a temperature below the gelatinization point of the starch. The starch is slurried in water and the acid (usually in concentrated form) is then added. Typically, the reaction takes place over an 8 to 16 hour period, after which the acid is neutralized with alkali (e.g., to a pH of 5.5) and the starch recovered by filtration.

When the converted starch is prepared by enzyme treatment the granular starch base is slurried in water and the pH is adjusted to about 5.6 to 5.7 with alkali or acid. A small amount of alpha amylase enzyme (e.g., about 0.02% on the starch) is added to the slurry, which is then heated above the gelatinization point of the starch. When the desired conversion is reached, the pH is adjusted with acid (e.g., to about 2.0) to deactivate the enzyme and the dispersion is held at the pH for a period of at least 10 minutes. Thereafter the pH may be readjusted. The resulting converted starch is usually jet-cooked to ensure complete solubilization of the starch and deactivation of the residual enzyme.

The use of hydrogen peroxide on starch as a converting (thinning) agent, either alone or together with metal catalysts has been known for some time. U.S. Pat. No. 3,655,644 issued on Apr. 11, 1972 to H. Durand, discloses a method of thinning derivatized starch using hydrogen peroxide and a copper ion catalyst.

U.S. Pat. No. 3,975,206 issued Aug. 17, 1976 to J. Lotzgesell et al., discloses an improved method for thinning starch employing hydrogen peroxide in combination with heavy metal salt catalysts such as iron, cobalt, copper or chromium, at an acid pH. This patent further lists a number of references directed to degrading (thinning) starch with hydrogen peroxide under a variety of conditions.

Another more recent patent, U.S. Pat. No. 4,838,944 issued Jun. 13, 1989 to L. Kruger, discloses a process for the degradation of granular starch using hydrogen peroxide and a catalytic amount of manganese salt, preferably potassium permanganate, in an aqueous slurry at a pH of 11.0 to 12.5.

While the methods described above and particularly those employing hydrogen peroxide have been found useful in degrading starch, there still is a need for a more efficient and faster process, particularly one that provides greater degradation as well as better controllability and consistency of the conversion process.

SUMMARY OF THE INVENTION

This invention relates to a process for degrading starch with hydrogen peroxide using a selected metal-based coordination complex catalyst.

More particularly, this invention involves a process for degrading granular starch with hydrogen peroxide at a temperature below the gelatinization temperature of the starch, the steps comprising providing an aqueous slurry of said granular starch at a pH of 11.0 to 12.5, adding an effective catalytic amount of a metal complex catalyst to said aqueous slurry, adding said hydrogen peroxide to said aqueous slurry in an effective amount to degrade the granular starch, the catalyst being a metal complex of the formula (I).

$$[(L_p M_q)_n X_r]^z y_s \tag{I}$$

where

L is an organic ligand containing at least three nitrogen atoms that coordinate with the metal M;

M is a transition metal from groups 6B, 7B or 8B or the lanthanide series;

X is a coordinating or bridging group selected from the following groups:

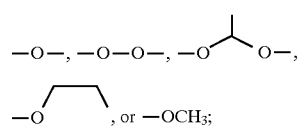, or $-OCH_3$;

Y is a monovalent or multivalent counterion leading to a charge neutrality, which is dependent on the charge z of the complex; p1 is an integer of from 1 to 4;

q is an integer of from 1 to 2;

n is an integer of from 1 to 2;

r is an integer of from 0 to 6;

z denotes the charge of the complex and is an integer which is 0 or positive; and s is equal to z/charge Y.

DETAILED DESCRIPTION OF THE INVENTION

It has now been found that a significantly improved process for degrading starch results when using hydrogen peroxide together with a selected metal-based coordination complex catalyst. This process results in a faster, higher level of starch degradation that is more efficient in the amount of peroxide and metal used and is especially advantageous in that it provides a high degree of process controllability and consistency.

The degradation of starch in accordance with this invention is achieved using hydrogen peroxide and a catalytic amount of a metal complex coordination catalyst in an aqueous alkaline solution. The metal complex that is used has the formula:

$$[(L_pM_q)_nX_r]Y_s \qquad (I)$$

where

L is an organic ligand containing at least three nitrogen atoms that coordinate with the metal M;

M is a transition metal from groups 6B, 7B or 8B or the lanthanide series of the periodic table (revised IUPAC form in CRC Handbook of Chemistry and Physics, 76th Edition, 1995–1996);

X is a coordinating or bridging group selected from the following groups:

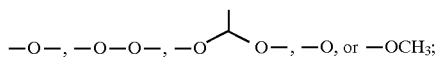

Y is a monovalent or multivalent counterion leading to a charge neutrality, which is dependent on the charge z of the complex;

p is an integer of from 1 to 4;

q is an integer of from 1 to 2;

n is an integer of from 1 to 2;

r is an integer of from 0 to 6;

z denotes the charge of the complex and is an integer which is 0 or positive; and s is equal to z/charge Y.

In the metal complex (I), the ligand L is an organic molecule containing at least three nitrogen atoms which are separated from each other by two or more ethylene linkages and more particularly can be described by the following formula:

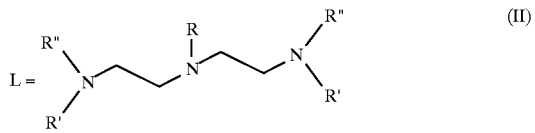

wherein

R, R' and R" can be H, CH$_3$, or C$_2$H$_5$; or where both R' together form an ethylene linkage and each R and R" are H, CH$_3$ or C$_2$H$_5$ and preferably CH$_3$; or where each R' and R" together form a

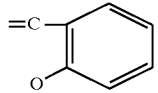

and R is H, CH$_3$ or C$_2$H$_5$ and preferably H.

Preferably, where ligand (II) is used, the metal M in the complex will be manganese, iron, chromium, molybdenum tungsten, lanthanum or ytterbium and more preferably manganese.

The bridging or coordinating group X as found in the metal complex (I) is independently selected from one of the following groups:

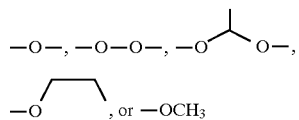

The nature of the bridging group will vary depending on the particular complex. For example, when n is 1, X is preferably

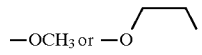

when n is 2, X is preferably

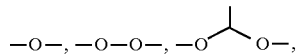

The counterion Y needed for charge neutrality of the complex is generally provided by carrying out the complexation reaction in the presence of a counterion-forming salt. The type of the counterion-forming salt is not critical for conversion, and may be for example, halides such as chlorides, bromides and iodides, pseudohalides, sulphates, nitrates, methylsulfates, phosphates, acetates, perchlorates, hexafluorophosphate and tetrafluoro-borate. However, some salts are more preferred than others in terms of product properties or safety. For example, small counterions will produce oily liquids and perchlorates are potentially explosive and could become a severe hazard upon large-scale preparation. A particularly preferred counterion is hexafluorophosphate, i.e., PF$_6^-$ which is conveniently obtained from KPF$_6$.

The metal complexes (I) used in this invention are known compositions which are disclosed in U.S. Pat. No. 5,153,161 issued Oct. 6, 1992 to J. Kerschner et al. and further in U.S. Pat. No. 5,246,612 issued Sep. 21, 1993 to W. Van Dijk et al., which discloses the use of such complexes in machine dishwashing compositions. The '161 patent discloses an earlier synthesis route to the complexes known in the art wherein manganese salt is reacted in aqueous medium with a proper nitrogen-containing ligand, e.g., 1,4,7-trimethyl-1,4,7-triazacyclononane, using an ethanol/water solvent mixture. This patent is directed to an improved method for synthesizing the manganese complexes wherein:

i) a manganese salt is reacted with ligand L in aqueous medium to form a manganese coordinated substance;

ii) oxidizing the coordinated substances with oxidizing agent;

iii) basifying the reaction mixture to a pH of at least 10.5; and iv) contacting the basified reaction mixture with a further oxidizing agent to form the manganese complex catalyst.

Ligands such as 1,4,7-trimethyl-1,4,7-triazacyclononanes and the method of preparation thereof are disclosed in U.S. Pat. No. 5,284,944 issued on Feb. 8, 1994 to S. Madison et al. The method involves first reacting diethylenetriamine (DET) with a sulfonylating agent to form a sulfonamidated DET in an aqueous medium with an inorganic base. In a second step, preferably without isolating intermediates, the sulfonamidated DET aqueous mixture is contacted with an aprotic organic solvent in the presence of a cyclizing unit such as ethylene glycol ditosylate or ethylene dibromide resulting in formation of a cyclized sulfonamidated triamine compound. Thereafter, the protecting groups are removed and the amine is alkylated, preferably without isolation of intermediates.

The disclosure of the '161, '612 and '944 patents noted above relating to the preparation of the metal complex catalysts and ligands is hereby incorporated by reference.

Examples of specific metal complexes that are useful in this invention are those having the following structures:

The degradation process may be carried out using the preformed metal complex catalyst (I) or the in-situ catalyst generation using an active blend of a metal source and a ligand source. The metal source can be derived from a metal salt of the formula MX, where M is a transition metal from groups 6B, 7B or 8B or the lanthanide series of the periodic table and X is an anion such as halide, sulfate, nitrate, or acetate. The metal salt is water or caustic soluble and

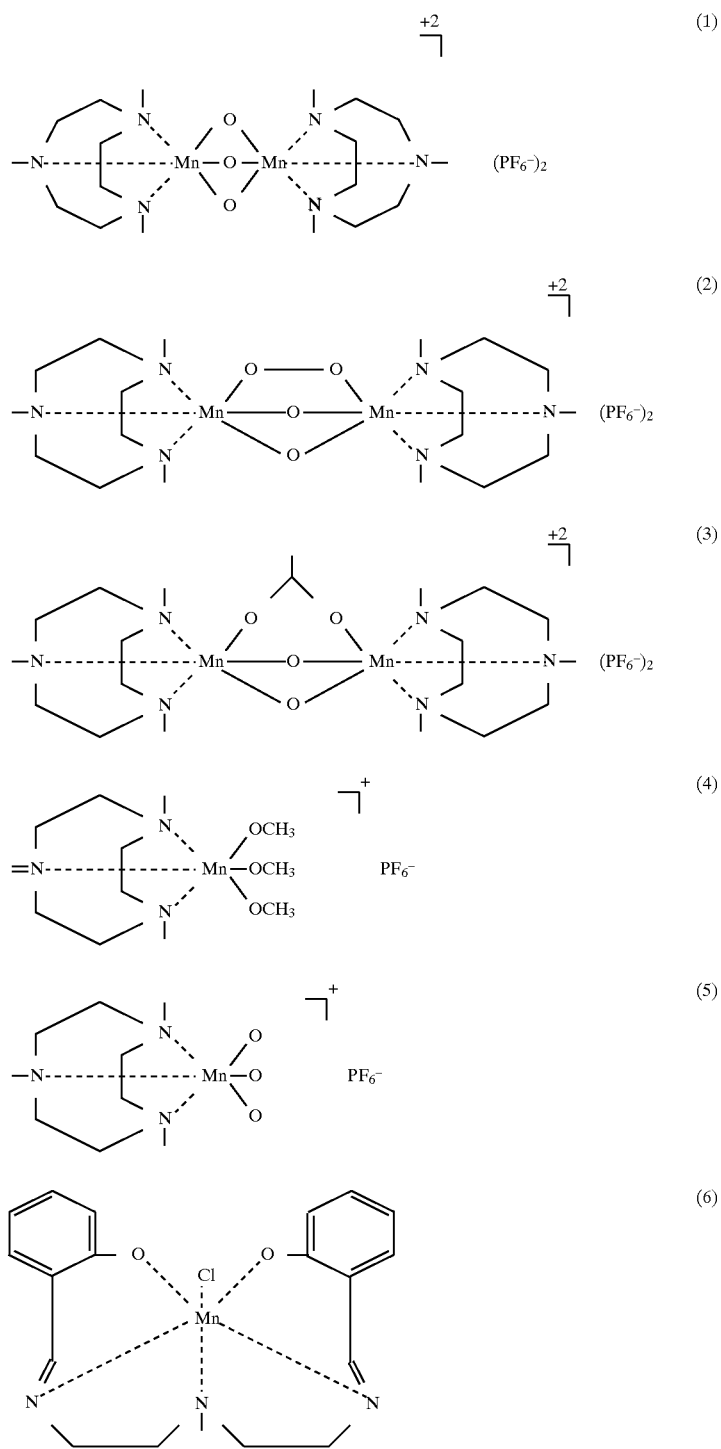

preferred metals are manganese, iron, chromium, molybdenum, tungsten, lanthenum and ytterbium with manganese being more particularly preferred. When using the in-situ catalyst, the metal salt and ligand may be added together or in separate additions. That is, the in-situ catalyst can be provided by adding the ligand and metal source directly to the starch slurry or more preferably, by premixing the ligand and metal source in a single solution prior to introduction into the starch slurry.

The starches which may be utilized in the present invention may be derived from any plant source including corn, potato, wheat, rice, sago, tapioca, waxy maize, sorghum and high amylose starch such as high amylose corn where the starch has at least 45% and more particularly at least 65% by weight of amylose content. Also included are derivatized starches such as ethers or esters, provided they are able to withstand the temperature and high pH without significant detrimental hydrolysis. The starches useful herein are in granular or dispersed form with granular starches being preferred. By dispersed or non-granular starch is meant any starch which has had its structure disrupted or removed, i.e., destructurized, by thermal (jet cooking, boiling water bath), mechanical (drum drying, spray drying, extrusion) or chemical (use of liquid ammonia, dextrinization, subject to high levels of caustic) means.

In carrying out the process of this invention a starch aqueous slurry is provided, ordinarily at 20 to 50% solids and the pH is raised to about 11.0 to 12.5, preferably 11.5 to 12.0 with sodium hydroxide. When using dispersed starch, the solids will be at a level that will provide a viscosity which would allow mixing, that is at up to 20% solids and more particularly 0.5 to 20% solids. Temperatures ranging from about 0° to 55° C. can be used to react the starch but a range of about 22° to 45° C. is most practical and preferred in the process with the higher temperatures requiring less time for completion of the reaction. In order to achieve improved reaction rates when using slurry temperatures below room temperature (e.g., 0° to 20° C.), it is preferable that the pH level be maintained at the upper portion of the designated useful pH range (pH 11.8 to 12.5). When the invention is directed to the preparation of a granular degraded starch, it is important that the selected temperature and pH do not cause gelatinization of the starch. With most starches, the temperature should not be allowed to go much above 50° C. because of the possible initiation of gelatinization.

Sufficient metal complex catalyst (I) or combination of metal salt and ligand when adding in-situ, are added to the slurry with stirring to provide a concentration of about 0.05 to 150 ppm (parts per million) and preferably about 0.1 to 90 of metal ions based on the amount of starch solids. If desired, the metal catalyst can be added to the slurry prior to the pH adjustment.

Hydrogen peroxide is then introduced into the slurry with the full amount added at once or if desired, divided into several portions (5 or 6 or more with larger amounts of peroxide) and added at about one hour intervals or added continuously as when metered in with a pump. The amount of hydrogen peroxide employed is from about 0.0075 to 15%, preferably about 0.01 to 2.0% anhydrous, and more preferably about 0.05 to 0.5% based on starch solids. The reagent is ordinarily introduced by the addition of sufficient 30 to 35% aqueous hydrogen peroxide as is commonly supplied in commerce. Alternatively, the hydrogen peroxide can be added to the slurry before the catalyst is added, in either the metal complex form or the in-situ combination of metal source and ligand source (either premix or separate additions). This mitigates the decomposition of catalyst that occurs at high pH over time and maximizes the amount of catalyst available to degrade the starch. This may allow lower treatment levels with catalyst to achieve the same level of degradation at the same peroxide loading.

While the starch degradation process of this invention has been described employing peroxide together with a metal complex catalyst, it will be understood that other compounds which yield hydrogen peroxide on contact with water can be substituted for the required hydrogen peroxide. Such hydrogen peroxide equivalents include alkali metal and alkaline earth metal peroxides such as sodium and potassium peroxide, alkali metal perborates, monopersulfates (e.g., Oxone, a registered trademark product of E. I. duPont), perphosphates, superoxides, percarbonates and peracids such as peracetic acid. In addition alkyl hydroperoxides, such as t-butyl hydroperoxide, have been found to be effective in the degradation process as an alternate oxidant. Other active oxygen specimens may also be used.

The hydrogen peroxide used in the process of this invention can be added to the starch slurry as a single shot or slowly over time as a number of portions, allowing time for its reaction with starch. After the addition of two or more such portions, the degree of starch degradation can be determined and additional hydrogen peroxide added as needed or the reaction can be terminated. In this slow addition procedure, the peroxide increments are reacted as they are added and better control of the degradation end-point can be achieved. A potassium iodide spot test can be used to confirm the presence or absence of hydrogen peroxide in test slurry.

The amount of hydrogen peroxide needed to reach the desired degradation level can be estimated or calculated using a procedure described below in Example VI.

When the desired degradation is reached the slurry is adjusted to a pH level of 5.0 to 6.0 using dilute acid such as dilute hydrochloric acid or other common acid. The slurry is then filtered and the filter cake optionally washed with water, refiltered and dried in a conventional manner.

The degree of starch degradation is correlated to and measured as the viscosity exhibited by a starch paste at a given solids concentration; as conversion of the starch (degradation) increases, viscosity is decreased.

For purpose of this invention, the water fluidity of the starches is measured using a Thomas Rotational Shear-Type Viscometer (such as a Stormer viscometer) standardized at 30° C. with a standard oil having a viscosity of 24.73 cps, which oil requires 23.12±0.05 seconds for 100 revolutions. As conversion of the starch increases (fluidity increases), the viscosity of the starch decreases. Accurate and reproducible measurements of the water fluidity are obtained by determining the time which elapses for 100 revolutions at different solids levels depending on the starch's degree of conversion (as conversion increases, the viscosity decreases). The procedure used involves slurrying the required amount of starch (e.g., 6.16 g dry basis) in 100 ml of distilled water in a covered copper cup and heating the slurry in a steam bath for 30 minutes with occasional stirring. The starch dispersion is then brought to the final weight (e.g., 107 g) with distilled water. The time required for 100 revolutions of the resultant dispersion at 81° to 83° C. is recorded and converted to a water fluidity number as defined in the table below:

| Time Required for 100 n Revolutions (seconds) Amount of Starch used (anhydrous, g): | | | | |
|---|---|---|---|---|
| 6.16[a] | 8.80[b] | 11.44[c] | 13.20[d] | Water Fluidity |
| 60.0 | | | | 5 |
| 39.6 | | | | 10 |
| 29.3 | | | | 15 |
| 22.6 | | | | 20 |
| 20.2 | | | | 25 |
| | 33.4 | | | 30 |
| | 27.4 | | | 35 |
| | 22.5 | | | 40 |
| | | 32.5 | | 45 |
| | | 26.8 | | 50 |
| | | 22.0 | | 55 |
| | | | 24.2 | 60 |
| | | | 19.2 | 65 |
| | | | 15.9 | 70 |
| | | | 13.5 | 75 |
| | | | 11.5 | 80 |
| | | | 10.0 | 85 |
| | | | 9.0 | 90 |

For a, b, c and d, final weights of starch solutions are 107, 110, 113 and 115 g respectively.

The following examples will further illustrate the embodiments of this invention. In these examples, all parts and percentages are given by weight and all temperatures in degrees Celsius unless otherwise noted.

EXAMPLE I

This example illustrates a representative embodiment of the process of this invention using hydrogen peroxide and a manganese metal complex coordination catalyst. The complex has the structure (1) shown earlier and the ligand is 1,4,7-trimethyl-1,4,7-triazacyclononane, coded as Me-TACN.

A starch slurry of 91.0 g of waxy corn starch was suspended in 135 g of water. The slurry was stirred and the temperature raised to and maintained at 40° C. by means of a water bath. The alkalinity of the mixture was adjusted to pH of 11.5 by the addition of 18 g of 3% aqueous sodium hydroxide. The manganese metal complex (1) was rapidly added in an amount of 12.0 mg in a 1 mL aqueous neutral solution to provide 19.2 ppm of manganese loading. With the mixture at 40° C., the degradation of the waxy starch was initiated by rapid addition of $H_2O_2$ (0.11 g of 30 weight percent, 360 ppm). Once the $H_2O_2$ had dissipated, the solution was neutralized with 10% $H_2SO_4$ to a pH of 5.5 to 6.5. The suspension was then filtered through Whatman #1 filter paper on a porcelain Buchner funnel with a vacuum of ~200 mm. The cake was rinsed twice with 250 mL of water and dried. The water fluidity (WF) was determined with a Stormer viscometer. This viscosity measurement was set-up by heating 6.16 to 13.2 g (dry basis) of starch in 100 mL of $H_2O$ for 30 minutes at 95° C. followed by measurement at 80° C. in the apparatus. The WF is determined by comparison of the falling time to a calibration chart. The degraded starch had a WF of 55.

EXAMPLE II

Several additional samples of waxy corn starch were degraded using different manganese metal complexes and the same procedure as described in Example I. The metal complexes included those identified as 1, 2, 3, 4, 5 and 6 as illustrated above. The results for the respective runs are shown in the table below.

| Samples | Starch (g) | Catalyst Complex | Catalyst Amount (mg) | Mn Loading (ppm) | Dissipation Time[1] (min) | Conversion (WF) |
|---|---|---|---|---|---|---|
| a | 91.01 | 1 | 12.0 | 18.0 | 0 | 55 |
| b | 90.42 | 2 | 8.2 | 12.3 | 0 | 53 |
| c | 90.73 | 3 | 9.4 | 13.0 | 0 | 54 |
| d | 91.74 | 4 | 10.1 | 13.2 | 0 | 50 |
| e | 91.80 | 5 | 9.2 | 12.2 | 158 | 23 |
| f | 91.08 | 6 | 12.7 | 19.3 | 129 | 29 |

[1]Dissipation time refers to the time it takes for $H_2O_2$ to disappear (using peroxide test strips as described in Example VI).

EXAMPLE III

In a variation of the procedure used in Example I, samples of caustic starch suspension were treated with a rapid addition of $H_2O_2$ (0.11 g of 30 weight percent, 360 ppm), followed immediately with a pre-mix of ligand and metal salt (as indicated by asterisk*) or separate additions of each. The components used and the results are shown below. The ligand used was 1,4,7-trimethyl-1,4,7-triazacyclononane (coded as Me-TACN).

| Sample | Starch (g) | Metal Salt | Mn Loading (ppm) | Ligand | Ligand Amt (mg) | Dissipation Time (min) | Conversion (WF) |
|---|---|---|---|---|---|---|---|
| g | 91.95 | $MnSO_4$ | 18.9 | Me—TACN | 5.2 | 2.33 | 32 |
| h* | 90.88 | $MnSO_4$ | 19.5 | Me—TACN | 5.3 | 0 | 49 |
| o | 90.74 | $MnCl_2$ | 19.1 | Me—TACN | 5.2 | 2 | 28 |
| j* | 90.70 | $MnCl_2$ | 19.1 | Me—TACN | 5.2 | 0 | 49 |
| k | 91.84 | $Mn(OAc)_2$ | 19.2 | Me—TACN | 5.3 | 2.5 | 30 |
| l* | 90.80 | $Mn(OAc)_2$ | 18.6 | Me—TACN | 5.6 | 1 | 46 |
| m | 91.08 | $Mn(OAc)_3$ | 18.8 | Me—TACN | 5.3 | 6 | 31 |
| n* | 90.81 | $Mn(OAc)_3$ | 19.3 | Me—TACN | 5.1 | 5 | 37 |

*premix

EXAMPLE IV

The procedure in Example III was followed using different metal salts which were added as a pre-mix. The results are shown below.

| Sample | Starch (g) | Metal Salt | Metal Loading (ppm) | Ligand | Ligand Amt (mg) | Dissipation Time (min) | Conversion (WF) |
|---|---|---|---|---|---|---|---|
| o | 90.70 | FeCl$_3$ | 20.18 | Me—TACN | 5.8 | 38 | 42 |
| p | 90.44 | LaCl$_3$ | 50.53 | Me—TACN | 5.6 | 150 | 40 |
| q | 90.17 | [Cr(H$_2$O)$_4$Cl$_2$]Cl | 18.93 | Me—TACN | 5.1 | <120 | 41 |
| r | 91.11 | WCl$_4$ | 65.90 | Me—TACN | 5.1 | 83 | 35 |
| s | 90.72 | MoCl$_3$ | 34.81 | Me—TACN | 5.1 | <120 | 41 |
| t | 91.33 | YBCl$_3$ | 62.04 | Me—TACN | 5.1 | 82 | 35 |

It will be noted that the ligand loadings were held relatively constant and an equimolar amount of metal ion was combined with it to generate the catalyst in-situ. The metal loadings increased compared with the manganese in the previous examples and while these combinations did not produce the level of degradation nor the rate as found with manganese, they did show higher degradation than when using a convention potassium permanganate catalyzed system.

EXAMPLE V

Several samples were run as in Example I using metal complex 1 but at different manganese loading levels, at constant H$_2$O$_2$ of 360 ppm, to show the effect in this variation on starch conversion. The results are as follows:

| Samples | Starch (g) | Catalyst Complex | Catalyst Amount (mg) | Mn Loading (ppm) | Dissipation Time (min) | Conversion (WF) |
|---|---|---|---|---|---|---|
| u | 91.01 | 1 | 12.0 | 18.0 | 0 | 55 |
| v | 91.69 | 1 | 0.41 | 0.56 | 3 | 46 |
| w | 90.14 | 1 | 0.3 | 0.45 | 5 | 47.5 |
| x | 90.86 | 1 | 0.2 | 0.30 | 10 | 46 |
| y | 90.42 | 1 | 0.09 | 0.135 | 40 | 45 |
| z | 90.30 | 1 | 0.05 | 0.075 | >180 | 40 |

While the results show that there would be better controllability of the conversion process when using lower amounts of manganese (loading at <18.0 ppm), the degree of conversion appears to level off and the rates become much slower as the amount of manganese goes below the 0.56 ppm level.

EXAMPLE VI

The amount of hydrogen peroxide needed to reach a desired degradation level was determined in the following manner.

A 90 g sample of waxy corn starch was suspended at 40% solids in de-ionized water held at 40° C. and the pH adjusted to 11.5 by addition of 18 g of 3% NaOH. The metal complex was introduced either as a solid or in solution followed by addition of a variable amount of hydrogen peroxide in a single shot. Alternatively, the caustic starch suspension can be treated with a variable amount of hydrogen peroxide followed immediately by introduction of metal catalyst which is generated in-situ by combining the appropriate ligand and metal salt in 1 mL aqueous solution. The metal catalyst used in the example was the manganese metal complex prepared in Example I and having the structure (1).

The amount of hydrogen peroxide which was added can vary but generally is from 90 to 3600 ppm with the total charge as illustrated in the following table being expressed in multiples of 360 ppm (~0.11 g of 30 wt % solution).

Reaction progress was monitored by use of starch-iodide type test strips (e.g. Quanto-Fix®). The reaction was complete when the test strip gave no response to the solution (i.e. darkening a few seconds after contact). When the hydrogen peroxide was fully dissipated, the suspension was neutralized with 10% H$_2$SO$_4$ to a pH of 5.5 to 6 as measured by a calibrated pH meter. The suspension was suction filtered and washed twice with 250 mL of water. The damp cake was then dried to 7 to 10% moisture after which it was ground to a free flowing powder and stored in a sealed container.

The extent of starch conversion was determined by use of a Stormer type viscometer as disclosed previously. This entire procedure was repeated for several levels of hydrogen peroxide and the extent of conversion or water fluidity determined. In this example using a metal catalyst loading of 132 ppm, the following conversion levels were determined at different levels of hydrogen peroxide.

| Metal Catalyst (1) | | |
|---|---|---|
| Experiment No. | H$_2$O$_2$* | Conversion (WF) |
| 1 | 0.750 | 51.0 |
| 2 | 0.771 | 50.0 |
| 3 | 1.012 | 58.0 |
| 4 | 1.498 | 64.0 |
| 5 | 1.498 | 62.5 |
| 6 | 2.028 | 70.0 |
| 7 | 2.044 | 68.0 |
| 8 | 2.987 | 72.0 |
| 9 | 3.035 | 72.0 |
| 10 | 3.985 | 74.0 |
| 11 | 4.026 | 75.0 |

*Expressed in multiples of 360 ppm charge.

The above points were plotted versus the hydrogen peroxide treatment levels and a line was fit to the curve using the method of least squares. The linear equation determined for this data was:

$$y = 10.711x + 47.192$$

with y being WF and x being hydrogen peroxide level (in multiples of 360 ppm).

EXAMPLE VII

In a variation of the procedure used in Example I, samples of caustic starch suspension were treated by adding hydrogen peroxide to the slurry before the metal complex catalyst in the following procedure. A starch slurry of 1000 g of waxy corn starch was suspended in 1500 g of water. The slurry was stirred and the temperature raised to and maintained at 40° C. by means of a water bath. The alkalinity of the mixture was adjusted to pH of 11.8 to 12.0 by the addition of 275 g of 3% aqueous sodium hydroxide. Hydrogen peroxide (H$_2$O$_2$) was added rapidly in the amounts shown in the table below and the mixture stirred for 20 minutes. The same manganese metal complex catalyst as used in Example 1, i.e., structure (1) with ligand 1,4,7-trimethyl-1,4,7-triazacyclononane, was used with the amounts shown in the following table. The manganese complex catalyst was added in a 1.5 mL solution. The dissipation time was noted and the conversion (WF) determined as in Example I with the results shown in the table below.

| Sample | Catalyst Amount (mg) | Mn Loading (ppm) | $H_2O_2$ (ppm) | Dissipation Time (min.) | Conversion (WF) |
|---|---|---|---|---|---|
| aa | 3 | 0.405 | 240 | 5 | 45.3 |
| bb | 1 | 0.135 | 240 | 15 | 40.0 |
| cc | 1 | 0.135 | 30 | 5 | 15.2 |
| dd | 1 | 0.135 | 120 | 5 | 31.7 |
| ee | 1 | 0.135 | 360 | 30 | 45.0 |

What is claimed is:

1. A process for degrading granular starch with hydrogen peroxide at a temperature below the gelatinization temperature of the starch, the steps comprising:
    a) providing an aqueous slurry of granular starch at a pH of 11.0 to 12.5
    b) adding an effective catalytic amount of the combination of a metal salt compound MX and a ligand L, where M is a transition metal selected from groups 6B, 7B, 8B or the lanthanide series of the periodic table and X is an anionic salt group, and L is an organic ligand containing at least three nitrogen atoms that can coordinate with the metal M; and
    c) adding from about 0.0075 to 15% by weight of anhydrous hydrogen peroxide, based on the weight of starch, to the aqueous slurry to degrade the granular starch.

2. The process of claim 1 wherein the hydrogen peroxide is added to the aqueous slurry before the combination of metal salt compound and ligand.

3. The process of claim 1 wherein the ligand L has the formula:

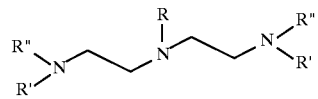

wherein
R, R' and R" are H, $CH_3$ or $C_2H_5$ or
where both R' together form an ethylene linkage and each R and R" are H, $CH_3$ or $C_2H_5$, or
where each R' and R" together form a

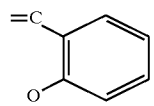

and R is H, $CH_3$ or $C_2H_5$.

4. The process of claim 3 wherein the metal M is present at a concentration of about 0.05 to 150 ppm, based on the weight of starch.

5. The process of claim 4 wherein M is manganese.

6. The process of claim 5 wherein the hydrogen peroxide is added to the aqueous slurry before the combination of metal salt compound and ligand.

7. The process of claim 5 wherein L is 1,4,7-trimethyl-1,4,7-triazacyclononane.

8. The process of claim 7 wherein n 2 and each x is —O—.

9. A process for degrading starch with hydrogen peroxide at a temperature of from about 0° to 55° C., the steps comprising:
    a) providing an aqueous slurry of starch at a pH of 11.0 to 12.5,
    b) adding an effective catalytic amount of a metal complex catalyst (I) to the aqueous slurry, and
    c) adding from about 0.0075 to 15% by weight of anhydrous hydrogen peroxide, based on the weight of starch, to the aqueous slurry to degrade the starch, the metal complex having the formula:

$$[(L_pM_q)_nX_r]_zY_s \quad (I)$$

where
L is an organic ligand containing at least three nitrogen atoms that coordinate with the metal M;
M is a transition metal selected from groups 6B, 7B or 8B or the lanthanide series of the periodic table;
X is a coordinating or bridging group selected from one of the following groups:

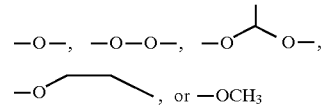

Y is a monovalent or multivalent counterion leading to a charge neutrality, which is dependent on the charge z of the complex;
p is an integer of from 1 to 4;
q is an integer of from 1 to 2;
n is an integer of from 1 to 2;
r is an integer of from 0 to 6;
z denotes the charge of the complex and is an integer which is 0 or positive; and
s is equal to z/charge Y.

10. The process of claim 9 wherein M is manganese.

11. The process of claim 10 wherein the metal M is present in a concentration of about 0.05 to 150 ppm, based on the weight of starch.

12. The process of claim 11 where L in the metal complex has the formula:

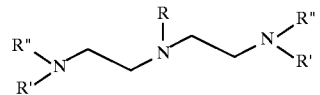

wherein
R, R' and R" are H, $CH_3$, or $C_2H_5$; or
where both R' together form an ethylene linkage and each R and R" together are H, $CH_3$ or $C_2H_5$ or;
where each R' and R" together form a

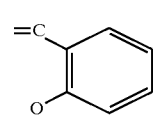

and each R is H, $CH_3$ or $C_2H_5$.

13. The process of claim 12 wherein the hydrogen peroxide is added to the aqueous slurry before the addition of metal complex catalyst.

14. The process of claim 12 where L is 1,4,7-trimethyl-1,4,7-triazacyclononane.

15. The process of claim 14 wherein n is 2 and each X is —O—.

16. The process of claim 9 wherein the hydrogen peroxide is added to the aqueous slurry before the addition of metal complex catalyst.

17. The process of claim 9 wherein the starch is a granular starch degraded at a temperature below the gelatinization temperature of the starch.

18. The process of claim 17 wherein M is manganese.

19. The process of claim 18 wherein the metal M is present at a concentration of about 0.05 to 150 ppm, based on the weight of starch.

20. The process of claim 17 wherein L in the metal complex has the formula:

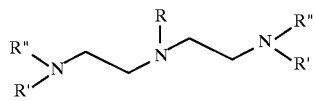

wherein

R, R' and R" are H, $CH_3$, or $C_2H_5$ or where both R' together form an ethylene linkage and each R and R" are H, $CH_3$ or $C_2H_5$, or where each R' and R" together form a

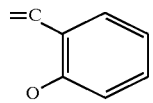

and R is H, $CH_3$ or $C_2H_5$.

21. The process of claim 20 wherein M is manganese.

22. The process of claim 21 wherein L is 1,4,7-trimethyl-1,4,7-triazacyclononane.

23. The process of claim 22 wherein n is 2 and each x is —O—.

24. The process of claim 20 wherein the metal M is present at a concentration of about 0.05 to 150 ppm, based on the weight of starch.

25. The process of claim 24 wherein M is manganese.

26. The process of claim 25 wherein the hydrogen peroxide is added to the aqueous slurry before the addition of metal complex catalyst.

27. The process of claim 25 wherein L is 1,4,7-trimethyl-1,4,7-triazacyclononane.

28. The process of claim 27 wherein n is 2 and each x is —O—.

* * * * *